US012048856B2

(12) United States Patent
Lambridis et al.

(10) Patent No.: US 12,048,856 B2
(45) Date of Patent: Jul. 30, 2024

(54) MULTI LAYER FIRE CURTAIN

(71) Applicants: Andrew C. Lambridis, Dix Hills, NY (US); Ashraf Gomaa, Stony Brook, NY (US)

(72) Inventors: Andrew C. Lambridis, Dix Hills, NY (US); Ashraf Gomaa, Stony Brook, NY (US)

(73) Assignee: MCKEON ROLLING STEEL DOOR CO., INC., Bellport, NY (US)

( * ) Notice: Subject to any disclaimer, the term of this patent is extended or adjusted under 35 U.S.C. 154(b) by 526 days.

(21) Appl. No.: 17/319,387

(22) Filed: May 13, 2021

(65) Prior Publication Data

US 2021/0361988 A1 Nov. 25, 2021

Related U.S. Application Data

(60) Provisional application No. 63/107,829, filed on Oct. 30, 2020, provisional application No. 63/027,172, filed on May 19, 2020.

(51) Int. Cl.
*E06B 9/08* (2006.01)
*A62C 2/06* (2006.01)
(Continued)

(52) U.S. Cl.
CPC ................. *A62C 2/10* (2013.01); *A62C 2/24* (2013.01); *A62C 3/14* (2013.01); *E06B 9/08* (2013.01)

(58) Field of Classification Search
CPC ..... A62C 2/10; A62C 2/24; A62C 3/14; E05F 1/002; E05F 1/006; E05F 15/72; E06B 9/70; E06B 9/58
See application file for complete search history.

(56) References Cited

U.S. PATENT DOCUMENTS 623,305 A * 4/1899 Bugge ........................ E06B 9/52 160/124
878,341 A * 2/1908 Cahill ........................ E06B 5/16 160/237
(Continued)

FOREIGN PATENT DOCUMENTS

BE 838584 5/1976
DE 102013100565 7/2013
(Continued)

OTHER PUBLICATIONS

Search Report dated Oct. 4, 2021 issued in European Patent Application No. 21174482.6.
(Continued)

*Primary Examiner* — Johnnie A. Shablack
(74) *Attorney, Agent, or Firm* — Cozen O'Connor

(57) ABSTRACT

A multi-layer rolling fire curtain assembly includes: a rotatable curtain roller positionable about a structure opening; a multi-layer fire curtain wrappable about the curtain roller and to be deployable from the curtain roller between an extended position and an open position, the fire curtain having a first end fixed to the curtain roller, and a free end, the free end being movable between a retracted position and an extended position. The fire curtain has: a fire resistant inner curtain layer arranged closer to the curtain roller, and a fire resistant outer curtain layer arranged opposite the inner layer. The inner and outer layers are affixed to one another by horizontally oriented connection seams, to connect the inner and outer layers to each other, the connection seams being configured so that the outer and inner layers are spaced apart by a plurality of baggy areas formed between adjacent connection seams.

14 Claims, 9 Drawing Sheets

(51) Int. Cl.
*A62C 2/10* (2006.01)
*A62C 2/24* (2006.01)

(56) References Cited

U.S. PATENT DOCUMENTS

| | | | | | |
|---|---|---|---|---|---|
| 978,771 | A * | 12/1910 | McCloud | E06B 9/24 | 160/231.1 |
| 1,536,587 | A * | 5/1925 | Johnson | E06B 5/16 | 49/5 |
| 3,231,006 | A * | 1/1966 | Fisher | E06B 9/13 | 160/311 |
| 4,391,865 | A * | 7/1983 | Constance | B32B 5/26 | 428/920 |
| 4,445,958 | A * | 5/1984 | Jaksha | E06B 9/11 | 156/227 |
| 5,265,662 | A * | 11/1993 | Hirao | E06B 9/15 | 160/133 |
| 5,304,408 | A * | 4/1994 | Jarosz | B32B 15/043 | 428/920 |
| 5,490,567 | A * | 2/1996 | Speer | A62C 8/06 | 169/50 |
| 5,862,851 | A * | 1/1999 | Stoebich | E06B 9/58 | 160/246 |
| 5,885,912 | A * | 3/1999 | Bumbarger | A62C 2/06 | 442/244 |
| 6,318,440 | B1 * | 11/2001 | Cordrey | A47H 23/10 | 160/124 |
| 6,357,507 | B1 * | 3/2002 | Stoebich | E06B 9/56 | 160/44 |
| 6,962,188 | B2 | 11/2005 | Coenraets | | |
| 7,225,882 | B2 * | 6/2007 | Miller | A62C 3/0257 | 442/302 |
| 8,164,830 | B2 | 4/2012 | Astill | | |
| 8,839,842 | B2 * | 9/2014 | Ashelin | E04B 2/74 | 160/40 |
| 8,875,802 | B2 * | 11/2014 | Jesclard, Jr. | A62C 3/065 | 169/48 |
| 8,991,467 | B2 * | 3/2015 | Ashelin | A62C 2/10 | 52/404.1 |
| 10,145,139 | B2 * | 12/2018 | Tufto | E04H 15/001 | |
| 10,174,545 | B2 * | 1/2019 | Janick | E06B 9/58 | |
| 10,221,561 | B2 * | 3/2019 | Siller | E04B 1/947 | |
| 10,329,817 | B2 * | 6/2019 | Knutson | F25D 13/00 | |
| 10,612,166 | B1 * | 4/2020 | Ball | D04H 1/43 | |
| 10,773,881 | B2 * | 9/2020 | Pherson | B65D 90/22 | |
| 11,173,328 | B2 * | 11/2021 | Reed | A62C 2/10 | |
| 2008/0001128 | A1 * | 1/2008 | Goldberg | A62C 2/10 | 252/604 |
| 2008/0110580 | A1 * | 5/2008 | Hoerner | F25D 23/021 | 160/113 |
| 2009/0008039 | A1 | 1/2009 | Lambridis | | |
| 2009/0194297 | A1 * | 8/2009 | Ortiz Teruel | B32B 29/02 | 169/50 |
| 2009/0266498 | A1 * | 10/2009 | Cooper | E06B 9/13 | 24/442 |
| 2010/0132894 | A1 * | 6/2010 | Knutson | E06B 9/13 | 160/113 |
| 2011/0061817 | A1 | 3/2011 | Smith | | |
| 2013/0189471 | A1 * | 7/2013 | Ashelin | A62C 2/18 | 428/212 |
| 2013/0255893 | A1 * | 10/2013 | Stobich | E04B 1/947 | 160/268.1 |
| 2013/0340953 | A1 * | 12/2013 | Knutson | E06B 3/80 | 160/236 |
| 2016/0108667 | A1 * | 4/2016 | Fischer | E06B 5/10 | 160/133 |
| 2017/0328129 | A1 | 11/2017 | Maertens et al. | | |
| 2020/0392784 | A1 * | 12/2020 | Lambridis | E06B 9/42 | |
| 2021/0331009 | A1 * | 10/2021 | Reed | E06B 9/11 | |
| 2021/0361988 | A1 * | 11/2021 | Lambridis | A62C 3/14 | |

FOREIGN PATENT DOCUMENTS

| | | | | |
|---|---|---|---|---|
| EP | 1559449 | A1 * | 8/2005 | A62C 2/10 |
| EP | 2158007 | B1 | 12/2014 | |
| EP | 3546026 | | 10/2019 | |
| GB | 2108839 | | 5/1983 | |
| GB | 2389310 | A * | 12/2003 | A62C 2/06 |
| JP | 2001082054 | A * | 3/2001 | |

OTHER PUBLICATIONS

Office Action dated Sep. 10, 2021 issued in U.S. Appl. No. 16/893,815.

* cited by examiner

MULTI LAYER FIRE CURTAIN

CROSS REFERENCE TO RELATED APPLICATIONS

This application claims benefit under 35 U.S.C. 119(e) from U.S. Provisional Patent application No. 63/027,172, filed on May 19, 2020 and U.S. Provisional Patent application No. 63/107,829, filed on Oct. 30, 2020, the entire contents of each of which are incorporated herein by reference.

BACKGROUND OF THE INVENTION

1. Field of the Invention

The present application relates to the field of fire curtains, and rolling door (i.e., rolling curtain) assemblies for deployment of such curtains, which are arranged in an opening of a building to provide a rolling fire resistant door assembly.

2. Related Art

Rolling door assemblies include a rolling door horizontally and rotatably arranged about a shutter roller positioned above a doorway or opening to extend the rolling door into, and retract the rolling door away from, an opening in a wall, such as a doorway. Wrapped about the shutter roller is a flexible door panel that can be deployed from the shutter roller between an extended position wherein the doorway is closed, and an open position. In the deployed and extended position, the rolling door's leading edge sits parallel with and flush on the ground. The door panel has lateral edges which are received in and guided along a guide channel disposed along a right-side edge and left-side edge of the doorway. The channels act as a guide during extension and retraction of the flexible door panel in the doorway.

Fabric, i.e., textile, fire curtains are known for use as the flexible door panel. However, some fabrics, while fire retardant, will, after being exposed to fire in a test scenario—a requirement for certification approval—fail endurance tests required by various testing agencies and organizations. There is, therefore, a need for a configuration of a fabric fire curtain and a rolling door system incorporating same, that will to pass such testing requirements.

SUMMARY OF THE INVENTION

In view of the foregoing, it is an object of the invention to provide an improved rolling fire and smoke blocking curtain, and in particular a multi-panel, i.e., multi-layer, curtain for fire prevention. The terms "curtain" and "door" are used interchangeably herein. Likewise, the terms "panel" and "layer" are used interchangeably herein. The same is true of the terms "fire resistant" and "fire retardant" and for "opening" and "doorway".

In accordance with a first aspect of the invention, a multi-layer rolling fire curtain assembly positionable about a structure opening in a structure wall includes: a rotatable curtain roller having a longitudinal axis and positionable about the structure opening; a flexible multi-layer fire curtain including fire resistant material and being configured to be wrapped about the curtain roller and to be deployable from the curtain roller between an extended position wherein the opening is closed, and an open position, the multi-layer fire curtain having a first end fixed to the curtain roller, and a free end, the free end being movable in a moveable direction, upon rotation of the curtain roller, between a retracted position where the structure opening is at least partially uncovered, and an extended position where the multi-layer fire curtain covers at least a portion of the structure opening. The multi-layer fire curtain has a fire resistant inner curtain layer arranged closer to the curtain roller, and a fire resistant outer curtain layer arranged opposite the inner curtain layer. The inner and outer curtain layers are affixed to one another by a plurality of horizontally oriented connection seams, spaced apart from one another vertically at a predetermined pitch, to connect the inner and outer curtain layers to each other. Each connection seam extends across the width of at least one of the inner and outer curtain layers. The connection seams are configured so that the outer and inner curtain layers are spaced apart by a plurality of baggy areas formed between adjacent ones of the connection seams; and first and second guide channels are arranged along a right-side edge and left-side edge of the opening, respectively. The multi-layer fire curtain has first and second lateral curtain edges with each configured and arranged so as to be received in and guided along a respective one of the first and second guide channels.

In another aspect, the multi-layer fire curtain is flexible, establishes a fire barrier across the structure opening in the extended position, and the fire resistant inner and outer layers are each made of a fire resistant textile material.

In another aspect, the multi-layer rolling fire curtain assembly further includes a motor configured to drive the rotatable curtain roller to wind the multi-layer fire curtain onto the rotatable curtain roller.

In another aspect, the multi-layer rolling fire curtain assembly further includes an additional fire and/or smoke retardant layer, of textile or non-textile material, arranged so as to be sandwiched between the inner and outer fire resistant textile layers.

In another aspect, the width of one of the inner and outer curtain layers is less than the width of the other of the inner and outer curtain layers so as to provide venting at both horizontally outer ends of the one of the inner and outer curtain layers, to allow for ventilation within the baggy areas.

In another aspect, the multi-layer rolling fire curtain assembly further includes a motor configured to drive the rotatable curtain roller to wind the multi-layer fire curtain onto the rotatable curtain roller.

In another aspect, the multi-layer rolling fire curtain assembly further includes a bottom bar connected to a leading edge of the free end of the multi-layer fire curtain.

In another aspect, in a case in which the multi-layer fire curtain is in a fully extended closed position, the bottom bar is parallel with and in contact with the ground.

In another aspect, the bottom bar is connected to the leading edge of the free end of the multi-layer fire curtain by clamping.

In another aspect, the additional non-textile fire retardant layer is made from at least one selected from the group consisting of: a fire retardant composite material, and a fire retardant metallic material.

In another aspect, the inner and outer curtain layers are connected only by the horizontally oriented connection seams, without using any vertical stitching to connect the inner and outer curtain layers, such that the multi-layer fire curtain comprises a plurality of horizontal curtain vents, stretching along an entire horizontal extent, substantially perpendicular to the deployment direction of the outer curtain layer.

In another aspect, the length of each of the horizontally oriented connection seams is equal to the width of the outer curtain layer, and the lateral edges of only the inner curtain layer make up the first and second lateral edges configured and arranged so as to be received in and guided along the respective ones of the first and second guide channels.

In another aspect, the lateral edges of the outer curtain layer do not extend into the channels, so as to form openings to the vents at each lateral edge of the outer curtain layer.

In another aspect, the horizontally oriented connection seams and the baggy areas formed between adjacent ones of the connection seams are configured to form the vents, so that each vent has a half-moon profile, and wherein the vents extend over the entire extent of the width of the outer curtain layer.

BRIEF DESCRIPTION OF THE DRAWINGS

The drawings are designed solely for purposes of illustration and not as a definition of the limits of the invention. It should be further understood that the drawings are not necessarily drawn to scale and that, unless otherwise indicated, they are merely intended to conceptually illustrate the structures and procedures described herein. In the drawings.

DETAILED DESCRIPTION OF THE DRAWINGS

Figure 1:
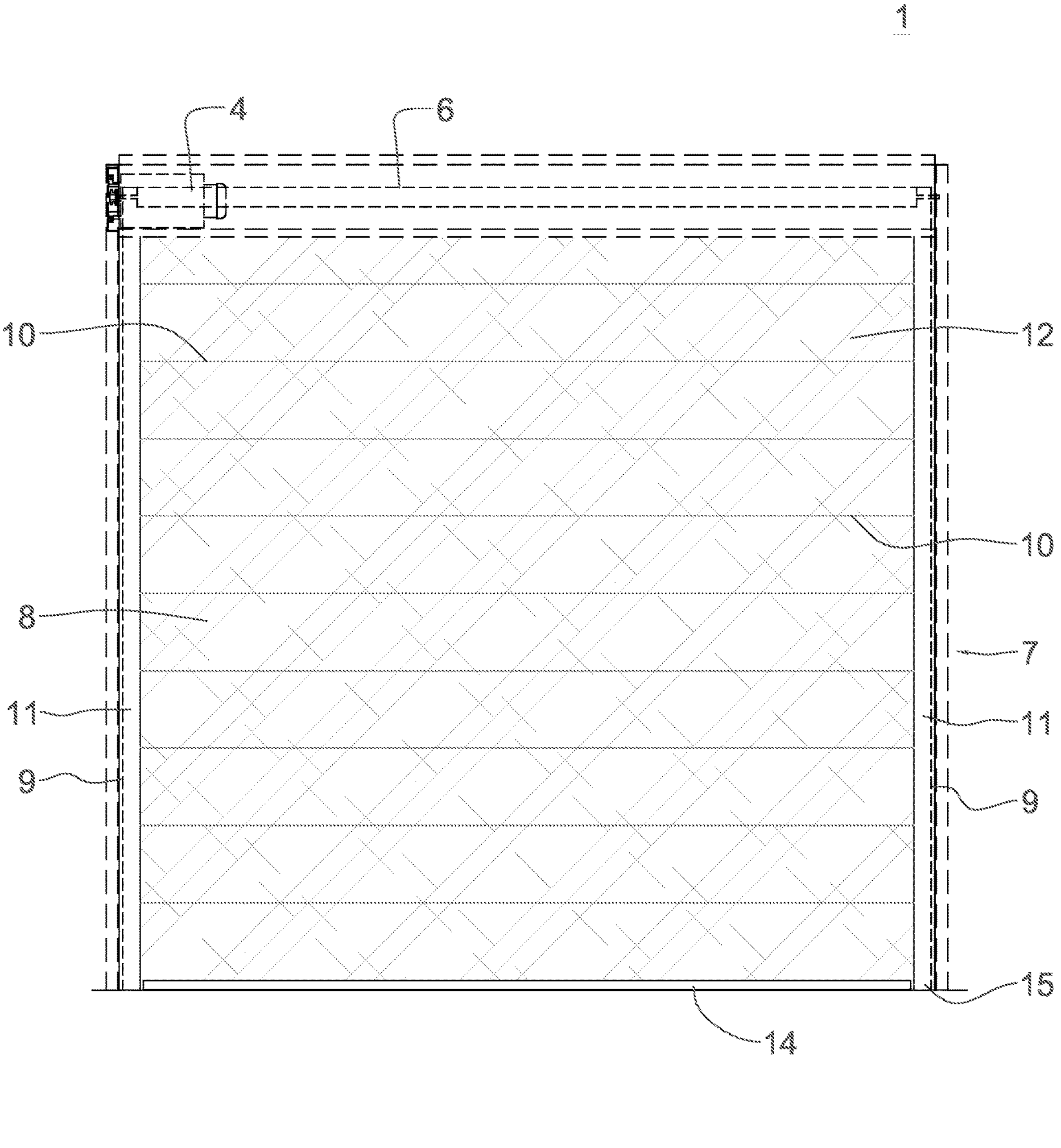
FIG. 1 is an elevation view of a rolling fire curtain assembly according to an aspect of the present invention.

Elements performing the same or similar functions will be indicated using the same or similar reference characters.

The present invention is directed to rolling fire curtain assembly having a fire curtain including multiple separate layers which are only attached intermittently to each other along the width of the curtain assembly. The use of multiple layers in the curtain is advantageous, at least because it provides, e.g., one or more extra layers of fire retardant, and smoke blocking, textile.

Moreover, this multi-layer arrangement of fire retardant and/or resistant textiles is particularly advantageous when multiple, for example two or more, textile layers are used in conjunction with one or more additional non-textile fire retardant layers. Throughout the disclosure and claims, the term "panel" is used interchangeably with the term "layer."

In one aspect of the present invention a two-layer textile curtain is provided, with a first, inner textile layer arranged closer to the shutter roller, and the second outer one arranged opposite the inner one.

In a further embodiment, these two textile layers are employed to sandwich the additional fire or smoke retardant layer, providing protection to the additional layer. For example, the additional layer, which may be of textile or non-textile material, is more likely to survive a fire if it is sandwiched between textile layers. This provides additional advantages and protection to the building and its occupants, e.g., temperature rise rating and increased fire resistant rating.

In a still further embodiment, venting is provided at both horizontally outer ends of one of the curtain layers, to reduce the risk of combustion within the baggy portion formed between the layers.

When two or more fabric layers are rolled up on a shutter roller, such as in rolling door/curtain assemblies, the outermost layer must travel a greater distance than the innermost layer. Moreover, if two separate layers contact one another over the entire extent of the deployment, the inner side fabric will pull on the outer fabric.

Also, in view of the different distance of travel, the outer layer or layers making up the multi-layer fire curtain will not remain taught during retraction of the curtain because the rolling diameters for these two layers is different. This is because the inner layer only wraps around the roller, at least to begin with, while the outer layer or layers wrap around the diameter of the roller and the additional thickness of the inner layer or layers.

In accordance with an embodiment of the invention, it has been discovered that the above drawbacks can be alleviated by providing a plurality of connection seams to connect the innermost and outermost layers, and any interposed layers, to each other, each seam extending across the width of at least one layer of the curtain. The seams can be spaced apart vertically at an appropriate pitch, for example, six inches to one foot apart. The invention is not limited to these examples and the optimal vertical pitch between the seams will be determined by factors such as the number of layers, and the diameter of the shutter roller.

The inventors have found that with the plurality of seams, the outer and inner fabric layers will be space apart by a plurality of baggy areas formed between adjacent seams, which provides for even coiling and uncoiling of the curtain.

FIG. 1 is front elevation view of multi-layer rolling fire curtain assembly 1 in accordance with an aspect of the present invention and having a fully deployed multi-layer fire curtain 7. The outer panel (i.e., outer layer) 8 of the fire curtain 7 is visible in this view and is divided into horizontally extending baggy segments 12 that are created due the multiple instances of seams 10, each instance of which extends along the width of the fire curtain 7.

The multi-layer fire curtain 7 has a proximal edge fixed at one end to the shutter roller 6, drivable by a motor 4, and a leading opposing free edge 15 connected to a bottom bar 14, by clamping 16. When the fire curtain 7 is in a fully extended closed position, as in FIG. 1, the bottom bar 14 is parallel with and in contact with the ground.

The multi-layer fire curtain 7 has lateral edges 9, each of which are guided along a respective guide channel 11 disposed along a right-side edge and left-side edge of the doorway or opening. The channels 11 act as a guide during extension and retraction of the flexible fire curtain and allows the curtain to be deployed within a "plane of deployment" containing both channels.

Figure 2:
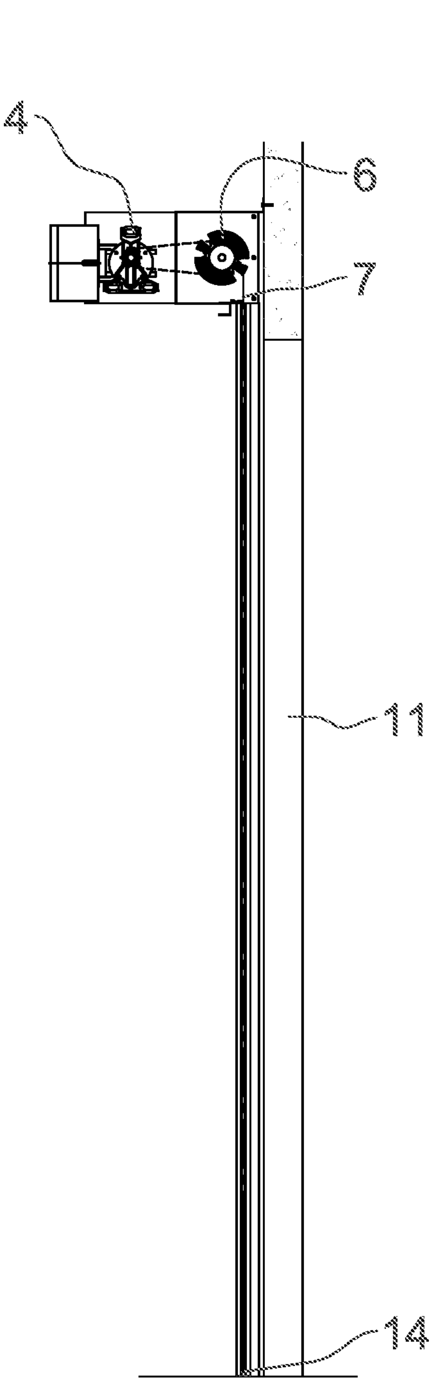
FIG. 2 is a side sectional view of the system shown in FIG. 1.

FIG. 2 is a side sectional view of the multi-layer rolling fire curtain assembly 1 shown in FIG. 1.

Figure 3:
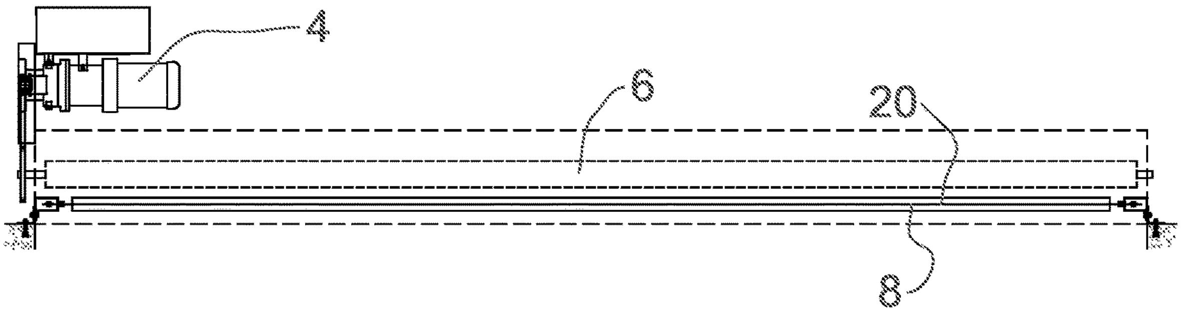
FIG. 3 is a plan view of the system shown in FIG. 1.

FIG. 3 is a partially see-through plan view of the multi-layer rolling fire curtain assembly 1 shown in FIG. 1. In this view, the top edge of the inner panel (i.e., inner layer) 20 of the curtain 7 is visible, adjacent to the outer panel 8.

Figure 4:
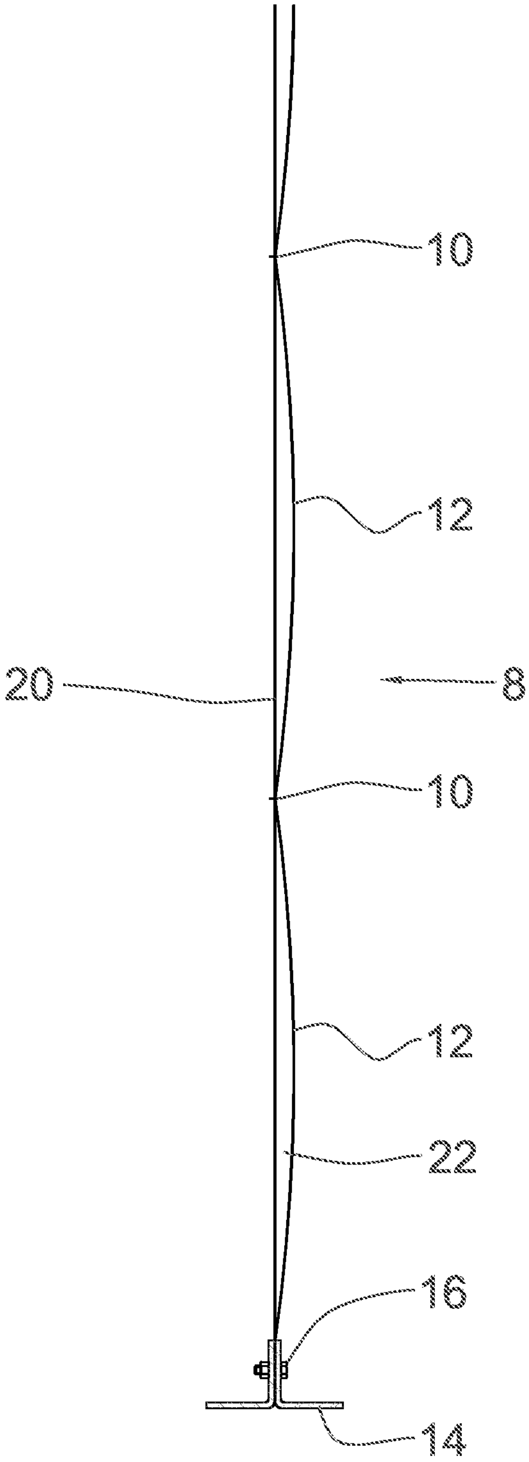
FIG. 4 is a side sectional view of a two-layer fire curtain according to an aspect of the present invention showing the lower uncoiled part of the fire curtain.

FIG. 4 is a side sectional view of the two-layer fire curtain 7 according to the present invention showing the lower uncoiled part of the fire curtain 7. The outer panel 8 is longer and, for that reason, is loose in comparison with the inner panel 20, which, for any given deployment position, will be relatively tighter that the corresponding portions of the outer panel.

Because the bottom of each panel is attached to the same bottom bar 14 at attachment clamping 16, the longer outer panel 8 will have a tendency to balloon outward, due the difference in length. However, this tendency for bagging is mitigated in a controlled manner by the use of the seams 10, spaced apart at certain distances, as discussed above, along the vertical direction to create the baggy sections 12.

As can be seen, due to the seams 10 provided at intervals along the height of the curtain 7, an appropriate amount of bagginess of a volume 22 is provided along the height of the curtain 7.

Figure 5:
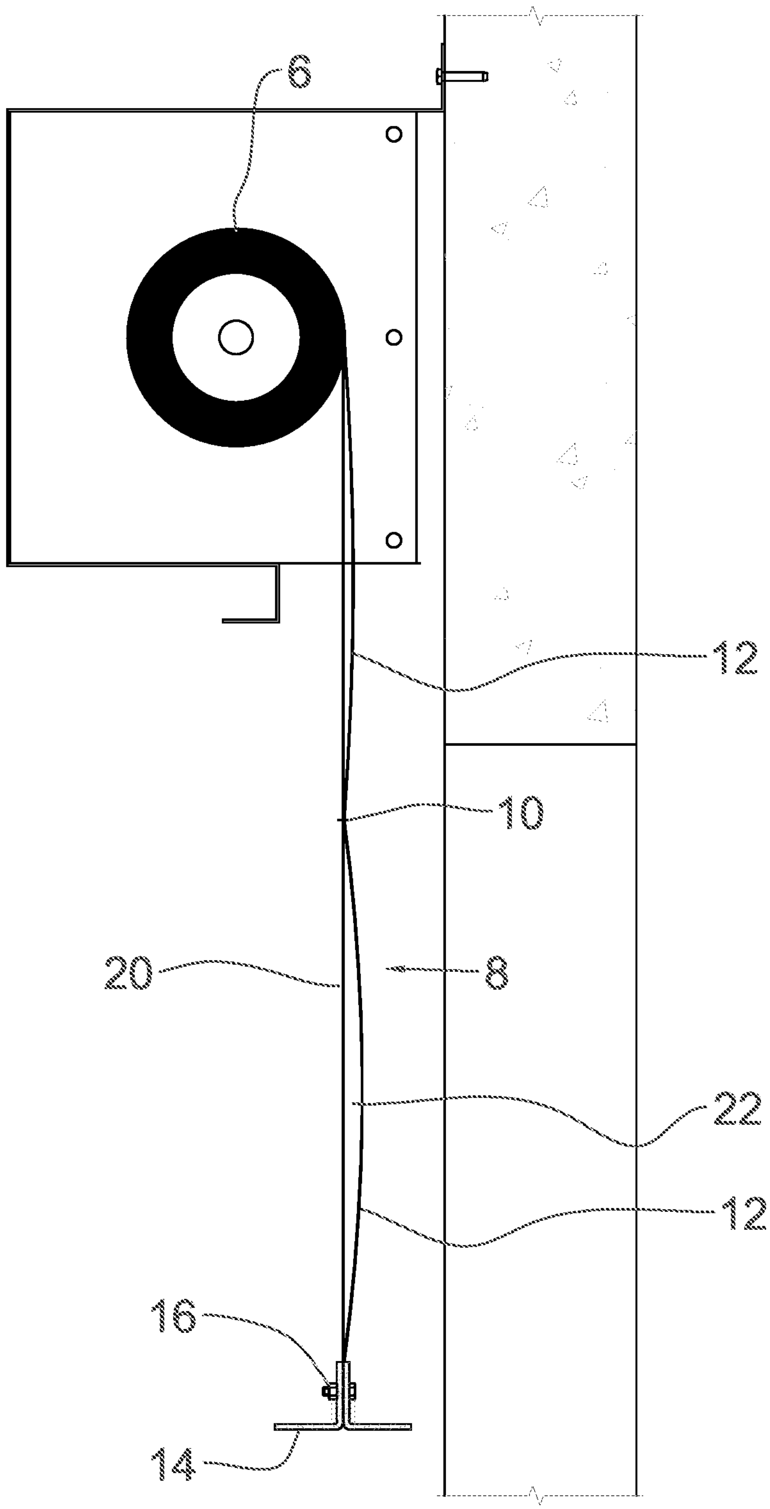
FIG. 5 is a detail side sectional view of the rolling fire curtain assembly showing the fire curtain partially coiled.

FIG. 5 is a detail side sectional view of the rolling fire curtain assembly 1 showing the fire curtain 7 partially coiled around the shutter roller 6. As can be seen at the upper portion of the figure, the individual baggy sections are coiled evenly due to the presence of the baggy portions between the seams 10.

Figure 6:
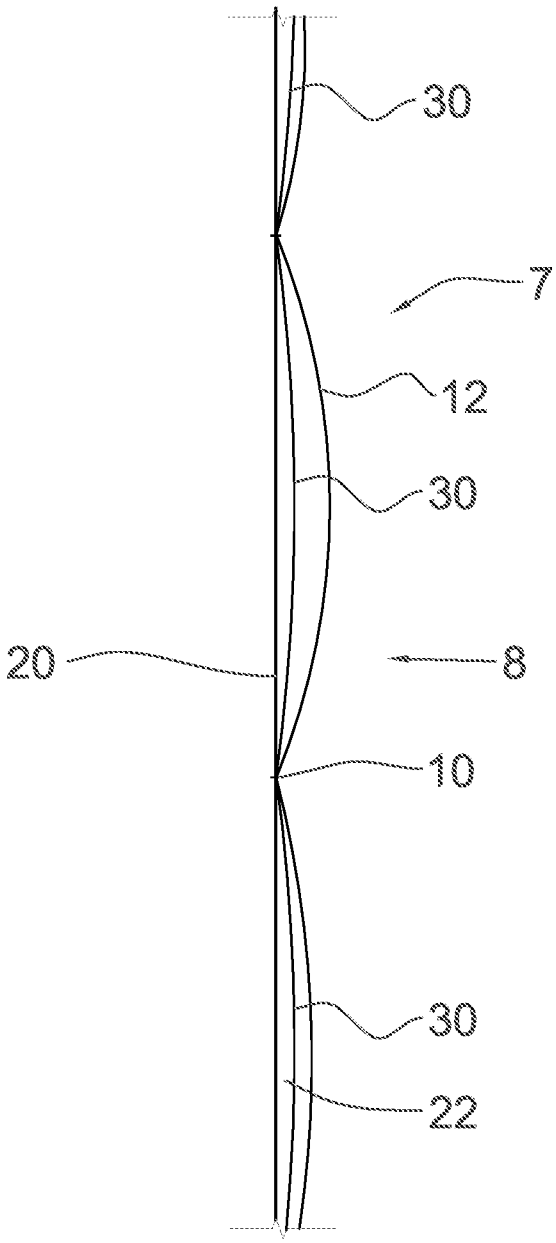
FIG. 6 is a detail side sectional view of another aspect of a multi-layer fire curtain with an intervening additional textile or non-textile fire retardant layer.

FIG. 6 is a detail of a portion of a curtain 7 having three layers. In particular, the curtain in this embodiment has an inner textile layer 20, which is formed so as to be tight on the coiling side, an outer textile layer 8, which has regions of bagginess of volume 22 as discussed above, and, between the inner and outer textile layers 20 and 8, a flame retardant layer 30.

As discussed above, the combination of the different types of flame retardant and smoke blocking layers provides the ability to customize curtains to meet various architectural, structural and safety concerns, such as curtain weight, appearance, strength, durability, smoke rating and fire rating levels, and so on.

In another aspect of the present invention, shown in FIGS. 7-9B, a multiple-layer textile curtain (two-layers are shown as an illustrative embodiment) is provided, with a first, inner curtain layer 20 arranged closer to the shutter roller, and the outer curtain layer 8 arranged opposite the inner layer. In this further aspect, however, only horizontal stitching is used to connect the inner and outer curtain layers, without using any vertical stitching to connect the layers. Due to this arrangement, the curtain will comprise a plurality of horizontal curtain vents, stretching along the entire horizontal extent (perpendicular to the deployment direction) of at least one of the layers, preferably of the outer layer.

Figure 9B:
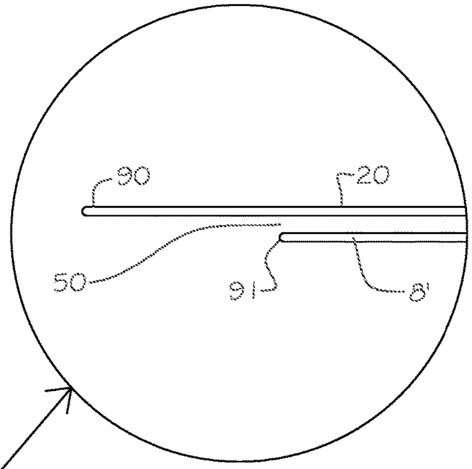
FIG. 9B is a detail view of a portion of FIG. 9A.

It should be understood that if two or more curtain layers are provided with equal width such that the curtain edges of all of the layers reside in the guide channels 11, venting between the layers will occur. However, the venting will be primarily confined in the guide channels. In contrast, by providing one or more outer curtain layers 8' of a narrower width as compared to one or more inner curtain layers 20 having edges 90 in the guide channels 11, venting between layer(s) 8' and layer(s) 20 can occur outside of the guide channels via a vent 50 as shown in FIG. 9B.

The inventors have found that the venting provided by such horizontal, and open ended, curtain vents prevents combustion from occurring in the pockets that are formed in the baggy regions between the inner and outer panels (i.e., layers). In pockets that are sealed both horizontally and vertically, combustion may occur, due the presence of oxygen in the air trapped between such pockets (absent the horizontal venting) and flammable gases that may be released in such pockets caused by coatings that may be used in the layers.

By virtue of the horizontal venting, no buildup of oxygen, and/or any flammable gaseous mixtures, will occur in the gaps between the inner and outer layers.

Except where the embodiment of FIGS. 7-9B differs from the embodiments of FIGS. 1-6, the same, or similar reference numerals will be used for same or similar elements.

Figure 7:
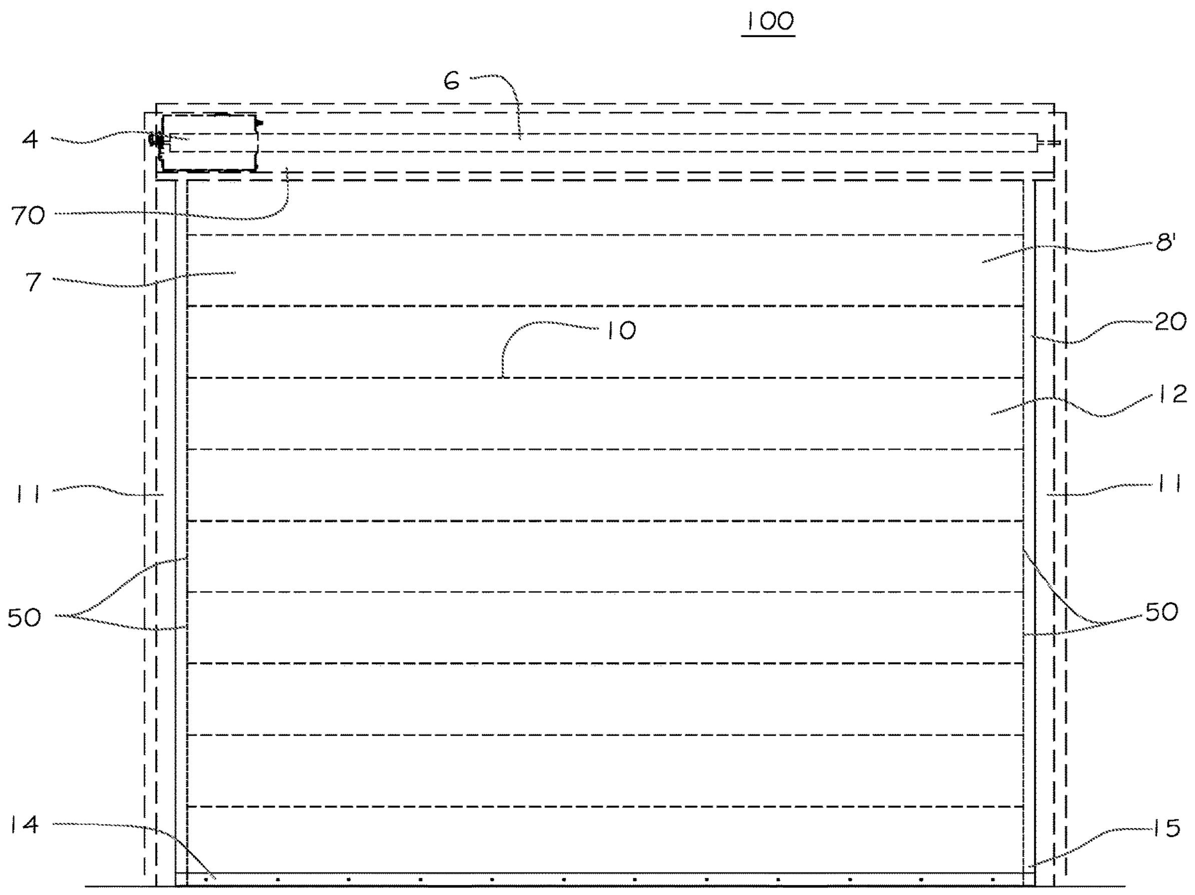
FIG. 7. is an elevation view of a rolling fire curtain assembly with venting according to a further aspect of the present invention.

FIG. 7 is front elevation view of multi-layer rolling fire curtain assembly 100 in accordance with the further aspect of the present invention and having a fully deployed multi-layer fire curtain 7 and including venting along the horizontal direction.

As in the embodiment illustrated in FIG. 1, the multi-layer fire curtain 7 of FIG. 7 has a proximal edge fixed at one end to the shutter roller 6, drivable by a motor 4, and a leading opposing free edge 15 connected to a bottom bar 14, by clamping 16, such as the clamping shown in FIG. 4. When the fire curtain 7 is in a fully extended closed position, as in FIG. 7, the bottom bar 14 is parallel with and in contact with the ground.

The outer panel 8' of the fire curtain 7 is visible in FIG. 7 and is divided into horizontally extending baggy segments 12 that are created due to the multiple instances of horizontal seams 10. Again, although a single outer panel 8' is shown, multiple such panels can be included.

In the embodiment illustrated in FIGS. 1-6, the inner and outer curtain panels, i.e., layers, have the same width such that the length of each horizontal seam 10 equals the width of the curtain. In the embodiment shown in FIGS. 7-9B, the width of the outer panel 8' is less than the width of the inner panel 20, such that the length of seams 10 only equals the width of the outer panel 8'. This difference in widths, coupled with the unsecured edges of outer panel 8' with respect to inner panel 20, facilitates for venting of gases which may form between the inner and outer curtains in the event of a fire condition, even as the edges of the inner panel 20 travels within the channels 11, as will be discussed further below.

The multi-layer fire curtain 7 according to the embodiment of FIGS. 7-9B has two distinct lateral edges 90 and 91. As best seen in FIGS. 9A and 9B, the inner panel 20 acts as a retaining curtain layer that contacts the roller barrel 6. Each of the lateral edges 90 of the inner panel 20 is guided along a respective guide channel 11 disposed along a right-side edge and left-side edge of the doorway or opening. The channels 11 act as a guide during extension and retraction of the flexible fire curtain and allows the panel to be deployed within a “plane of deployment” containing both channels.

On the other hand, the lateral edges 91 of the outer panel 8' do not extend into the channels 11. This provides the vent 50 at the edge of the outer panel 8', which vent 50 is seen in the plan views of FIGS. 9A and 9B.

Figure 8:
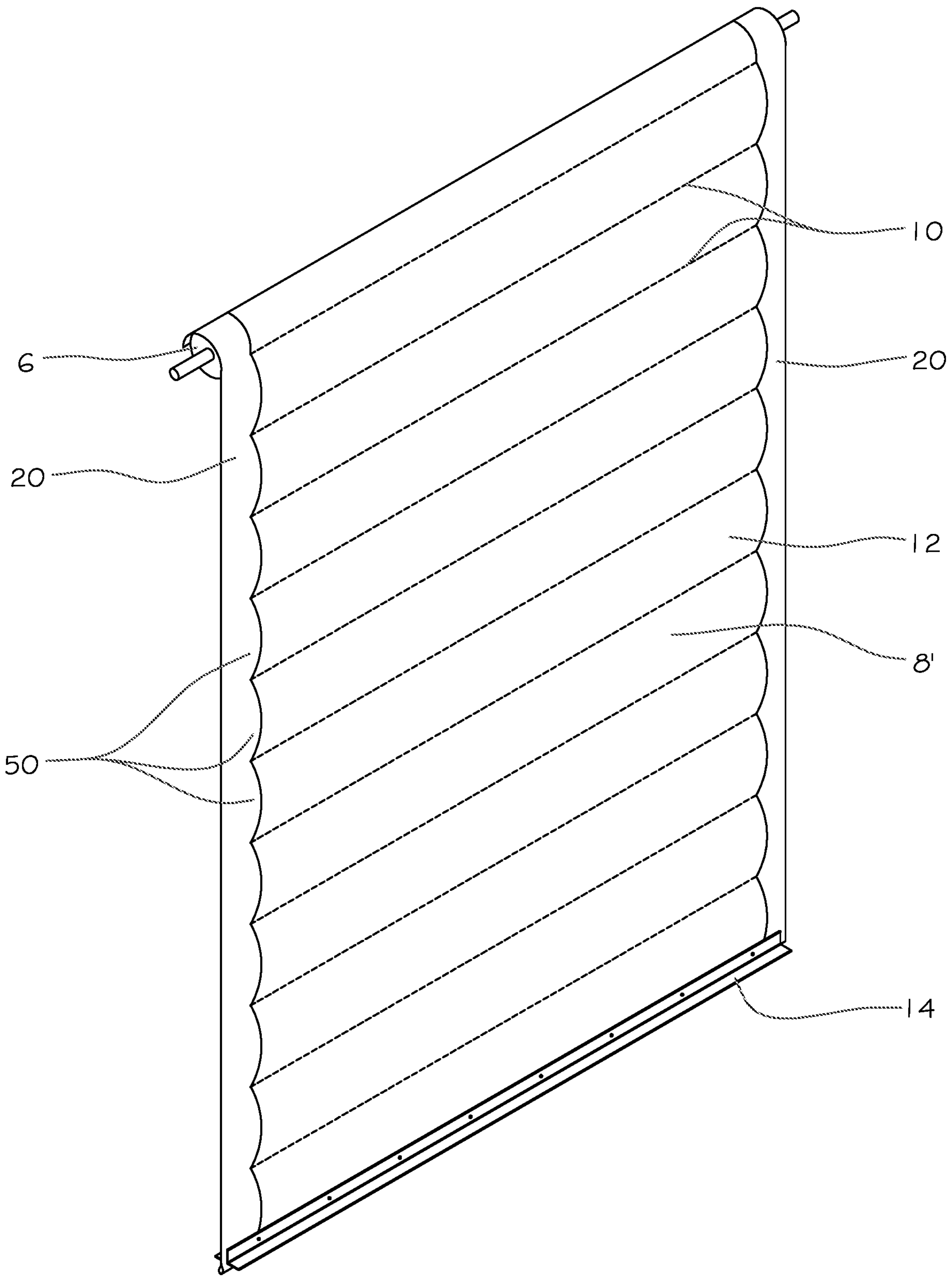
FIG. 8 is an isometric view of the assembly of FIG. 7, showing only a subset of the components for better visibility.

The vents 50 are also visible in the isometric view of FIG. 8, which, for purposes of clarity, does not show the channels or the hood enclosure. As can be seen in FIG. 8, the outer panel 8' is only sewn by stitching 10 to the inner panel 20 along its horizontal extent, and minimal to no vertical stitching is used between the outer panel 8' and the inner panel 20, even at the edges of the curtain 7. By virtue of this configuration, the bagginess of the looser outer panel 8', provides for the vents 50, of a half-moon profile in the illustrated embodiment, which vents extend over the entire extent of the width of the outer panel 8'.

Figure 9A:
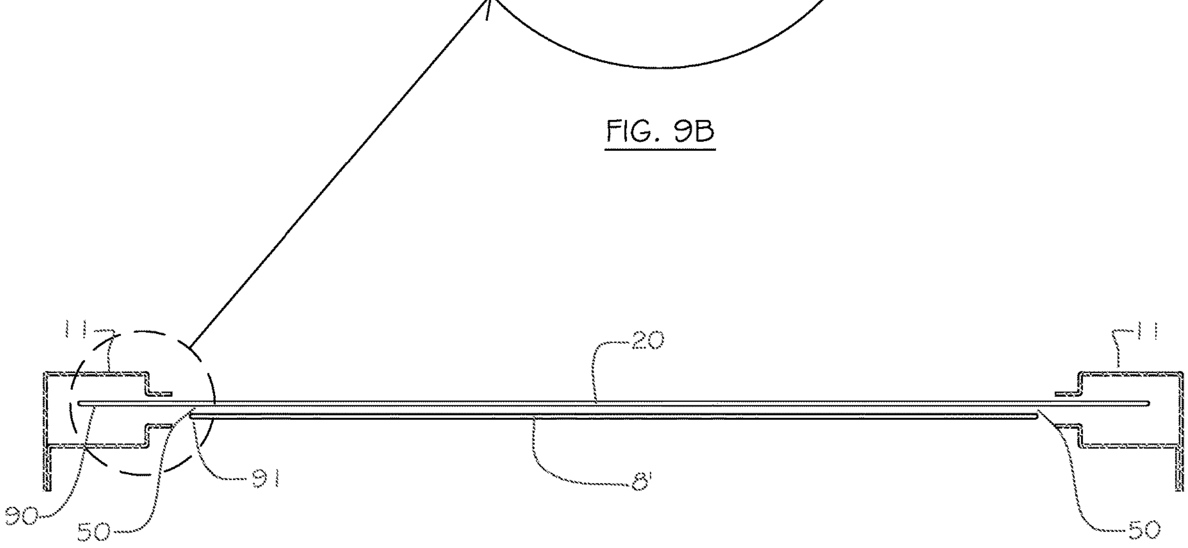
FIG. 9A is a plan view of the curtain according to the further aspect.

FIGS. 9A and 9B are plan and detailed plan views, respectively of the multi-layer rolling fire curtain assembly 100. To illustrate the venting 50, these plan views are taken in cross-section at a point, i.e., at a vertical level, between any horizontal stitching 10.

As can be seen in these figures, and as discussed above, the inner panel 20, which acts as a retaining curtain layer, is wider than the outer panel 8', which functions as a venting curtain layer. This larger dimension at each edge of the inner panel 20 allows for an extra portion of the inner panel 20, which culminates at the lateral edge 90, for being drawn through the guide assembly 11.

The outer panel 8' is narrower than the inner panel 20 and positioned so that its lateral edges 91 come up short of, and do not ride inside of, the guide assembly 11. Because of the difference in width between the panels 20 and 8', the gap formed between the inner panel 20 and the outer panel 8', which from the front appears as a baggy segment 12, ends at each side before the edge of the curtain 7. This is shown in detail in FIG. 9B. The location of the vents 50 is horizontally inward of the guide assembly 11 and prevents the guide assembly 11 from blocking the ventilation of the vents 50.

By virtue of this above configuration, the embodiment of FIGS. 7-9B provide the advantages of the embodiments of FIGS. 1-6 and also ensure full horizontal ventilation of the baggy portions at each edge of the curtain 7. Such ventilation properties are important to allow for the dissipation of flammable gases that may build up between the curtains as a result of the curtain fabric, coating used on the curtain fabric and/or pockets of oxygen trapped between the curtain layers.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice.

What is claimed is:

1. A multi-layer rolling fire curtain assembly positionable about an opening in a structure wall, comprising:

a rotatable curtain roller having a longitudinal axis and positionable about the opening;

a flexible multi-layer fire curtain comprising fire resistant material and being configured to be wrapped about the curtain roller and to be deployable from the curtain roller between an extended position wherein the opening is closed, and an open position, the multi-layer fire curtain having a first end fixed to the curtain roller, and a free end, the free end being movable in a moveable direction, upon rotation of the curtain roller, between a retracted position where the structure opening is at least partially uncovered, and an extended position where the multi-layer fire curtain covers at least a portion of the structure opening, the multi-layer fire curtain having:

a fire resistant inner curtain layer arranged in contact with the curtain roller, and a fire resistant outer curtain layer arranged opposite the inner curtain layer, wherein the outer curtain layer is narrower and longer than the inner curtain layer;

the inner and outer curtain layers being affixed to one another at the first end and the free end, and by a plurality of horizontally oriented connection seams, spaced apart from one another vertically to connect the inner and outer curtain layers to each other, each connection seam extending across the width of the outer curtain layer, the connection seams being provided at intervals so that the outer curtain layer forms a plurality of baggy areas between adjacent ones of the connection seams; and first and second guide channels arranged along a right-side edge and left-side edge of the opening, respectively, wherein the inner curtain layer has first and second lateral curtain edges each configured and arranged so as to be received in and guided along a respective one of the first and second guide channels.

2. The multi-layer rolling fire curtain assembly according to claim 1, wherein the horizontally oriented connection seams are vertically separated from each other at a constant pitch.

3. The multi-layer rolling fire curtain assembly according to claim 1, wherein the multi-layer fire curtain is flexible, establishes a fire barrier across the structure opening in the extended position, and the fire resistant inner and outer layers are each made of a fire resistant textile material.

4. The multi-layer rolling fire curtain assembly according to claim 1, further comprising a motor configured to drive the rotatable curtain roller to wind the multi-layer fire curtain onto the rotatable curtain roller.

5. The multi-layer rolling fire curtain assembly according to claim 3, further comprising an additional fire retardant layer arranged so as to be sandwiched between the inner and outer fire resistant textile layers.

6. The multi-layer rolling fire curtain assembly according to claim 3, wherein the narrower width of the outer curtain layer provides venting at a horizontally outer end of the outer curtain layer, to allow for ventilation within the baggy areas.

7. The multi-layer rolling fire curtain assembly according to claim 4, further comprising a bottom bar connected to a leading edge of the free end of the multi-layer fire curtain.

8. The multi-layer rolling fire curtain assembly according to claim 7, wherein in a case in which the multi-layer fire curtain is in a fully extended closed position, the bottom bar is parallel with and in contact with the ground.

9. The multi-layer rolling fire curtain assembly according to claim 7, wherein the bottom bar is connected to the leading edge of the free end of the multi-layer fire curtain by clamping.

10. The multi-layer rolling fire curtain assembly according to claim 5, wherein the additional fire retardant layer is made from at least one selected from the group consisting of:

a fire retardant composite material, and a fire retardant metallic material.

11. The multi-layer rolling fire curtain assembly according to claim 1, wherein the inner and outer curtain layers are connected only by the horizontally oriented connection seams, without using any vertical stitching to connect the inner and outer curtain layers, such that the multi-layer fire curtain comprises a plurality of horizontal curtain vents, stretching along an entire horizontal extent, perpendicular to the deployment direction, of the outer curtain layer.

12. The multi-layer rolling fire curtain assembly according to claim 11, wherein:

the length of each of the horizontally oriented connection seams is equal to the width of the outer curtain layer, and the lateral edges of only the inner curtain layer comprise the first and second lateral edges configured and arranged so as to be received in and guided along the respective ones of the first and second guide channels.

13. The multi-layer rolling fire curtain assembly according to claim 12, wherein the lateral edges of the outer curtain layer do not extend into the channels, so as to form openings to the vents at each lateral edge of the outer curtain layer.

14. The multi-layer rolling fire curtain assembly according to claim 13, wherein the horizontally oriented connection seams and the baggy areas formed between adjacent ones of the connection seams are configured to form the vents, so that each vent has a half-moon profile, the vents extending over the entire extent of the width of the outer curtain layer.

* * * * *